Patented May 23, 1933

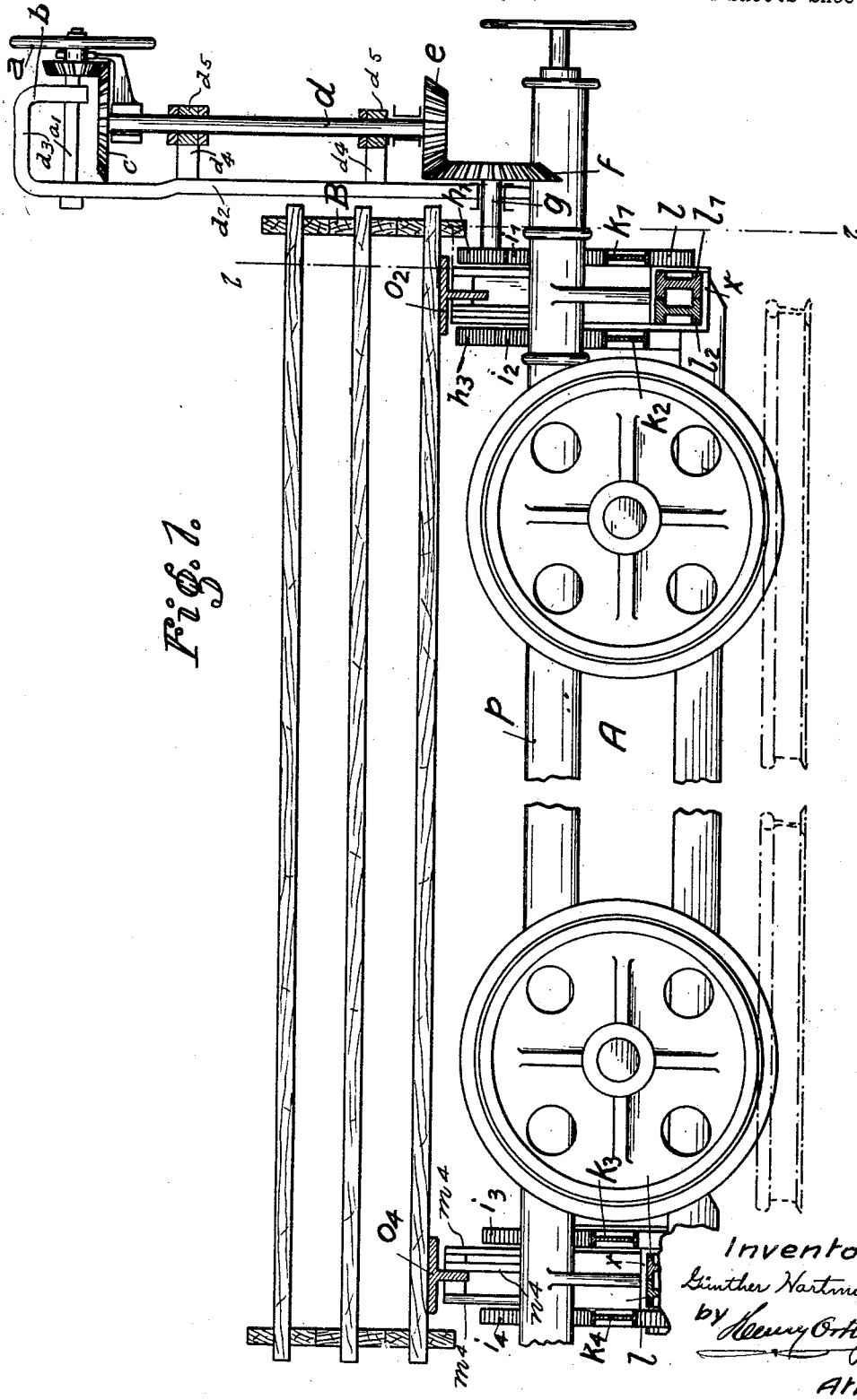

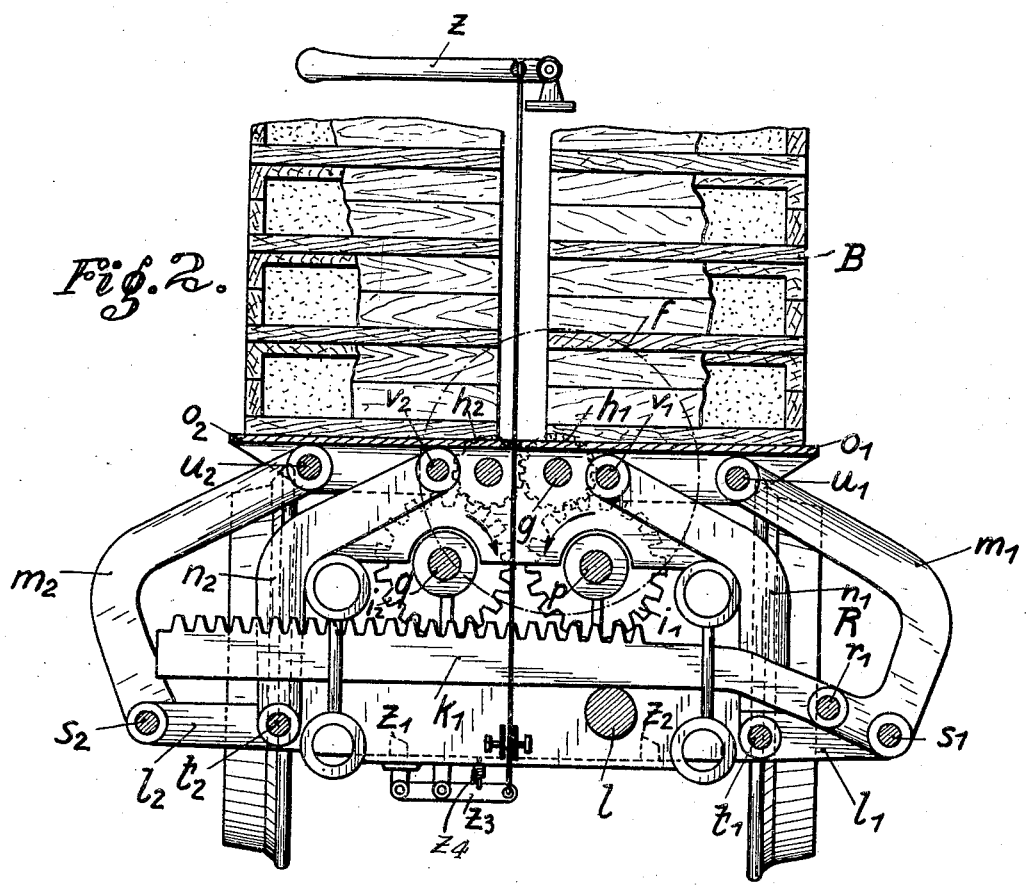

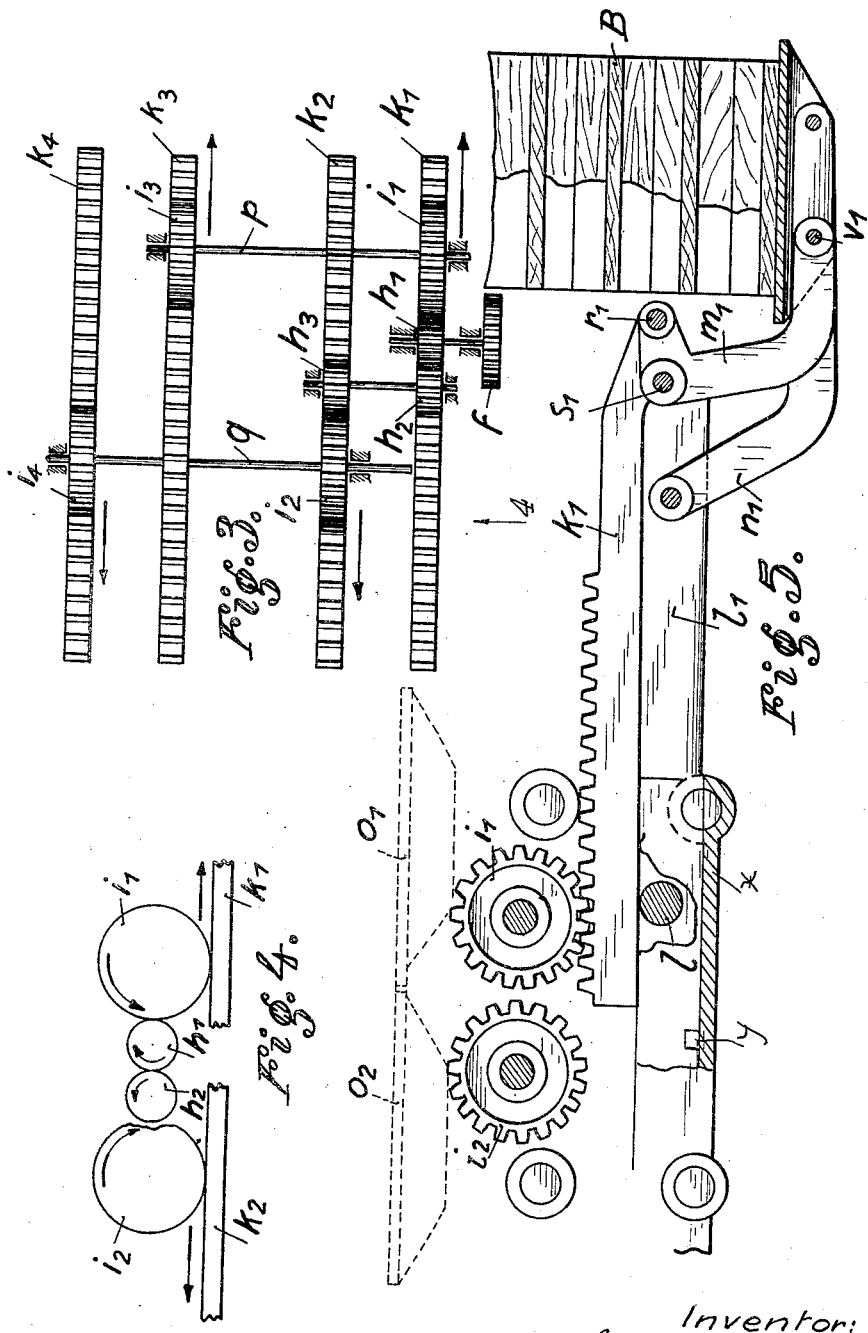

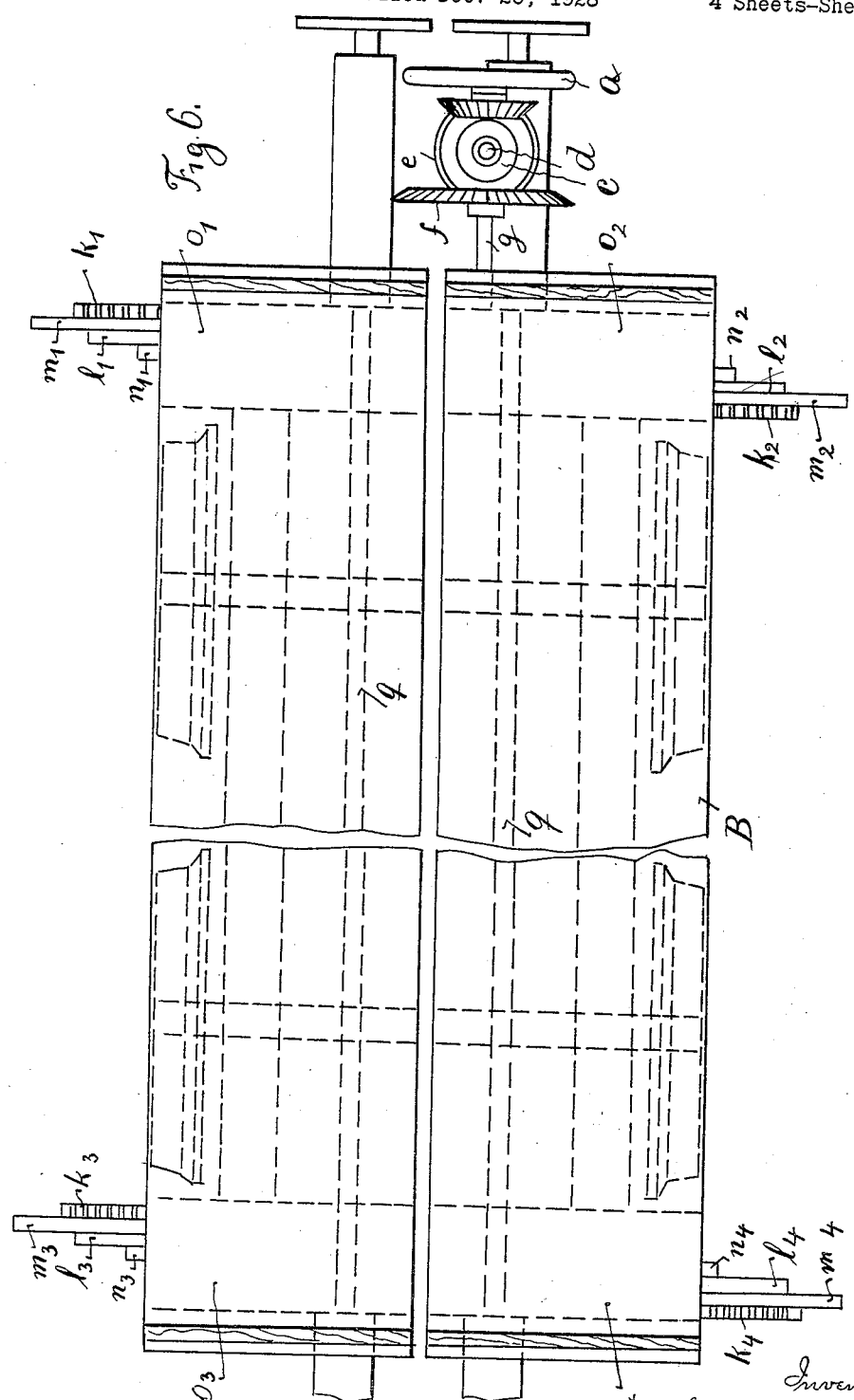

1,910,104

UNITED STATES PATENT OFFICE

GÜNTHER HARTMANN, OF VIETZ ON THE OSTBAHN, GERMANY

TRUCK FOR CONVEYING BRICK-FRAMES

Application filed December 26, 1928, Serial No. 328,572, and in Germany January 11, 1928.

This invention relates to a truck for conveying brick-frames of any kind, specially for conveying said frames with the bricks from the press to the drying place or from the drying place to the kiln.

Trucks for this purpose which consist of a platform adapted to be moved up and down, and on which the material to be transported rests are known. The platform can however be deposited only on brackets. Another truck has become known which is designed to be run under the frame. This frame stands transversely to the truck and it is clamped and then lifted.

The truck according to this invention differs from the trucks of known type in that it is adapted to carry a drying frame or a stack of drying frames on each long side. There are a pair of bed plates on each side of the truck which are swingable laterally to enable the bed plates to be raised and lowered. With this object in view the truck is constructed as follows:—

A pair of bed plates are arranged on each long side of the truck, the plates being laterally disposed at the ends of the said truck. Each pair of bed plates is so mounted that it may be swung laterally for raising or lowering. The bed plates remain permanently in horizontal position during the lowering and raising thereof. If only two bed plates are provided for one or several frames carried at one side of the truck, the truck has to be balanced by a counter weight on its other side so that tipping of the truck is prevented. The swinging and lowering of the bed plates can be effected for instance by racks connected with the bed plates by elbow levers. Separate guide rods hingedly connected to the elbow levers serve for guiding the bed plates in a horizontal plane during their movement.

In the depositing position the bed plates are on the outer sides of the truck wheels so that the right hand drying frame is deposited at the right and the left hand drying frame on the left of the truck. This arrangement presents the advantage that at the drying place two rows of drying frames can be simultaneously deposited. The rows of the deposited frames are spaced from each other a large distance so that long passages are produced, whereby the drying is accelerated.

A brick truck for depositing towards both sides the frames which hold the moulded bricks is illustrated by way of example in the accompanying drawings:

Fig. 1 is a side elevation of the brick truck with certain parts shown in section.

Fig. 2 is a section on line 2—2 of Fig. 1.

Fig. 3 illustrates diagrammatically in plan view how the four racks are driven by wheel gears.

Fig. 4 is an elevation of Fig. 3 with the rack $k_1$ shown broken away.

Fig. 5 is a diagrammatical view showing the right side of the truck, the bed plate being swung and lowered.

Fig. 6 is a plan view of the brick truck.

The frame of the brick truck is designated as a whole in Fig. 1 by A. The bed plates $o_1$ to $o_4$ are mounted on frame A and are adapted to be simultaneously lowered in pairs in opposite directions, and on these plates rest drying frames made either in one piece or composed of stacked frames. Arranged on the truck frame A are racks $k_1$ to $k_4$ with sliding means and guide rods $l_1$ to $l_4$. Levers $m_1$ to $m_4$ and $n_1$ to $n_4$ for the horizontal lateral movement and for the lowering of the bed plates $o_1$ to $o_4$, and the driving gear wheels $h_1$, $h_2$, $h_3$ and $i_1$ to $i_4$ meshing with the racks $k_1$ to $k_4$ are also arranged on the truck.

The swinging of the bed plates $o_1$ to $o_4$ in lateral direction and the lowering of the same at the sides of the truck are carried out in the following manner:

A vertical bracket $d_2$ having a hook shaped upper end portion $d_3$ is fixedly attached in any desired way to the underneath structure of the truck. The bracket is provided with one or more arms $d_4$ having bearings $d_5$ for supporting and guiding a shaft $d$. The upper hook shaped portion $d_3$ of bracket $d_2$ carries a shaft $a_1$ upon which a bevel gear $b$ is mounted.

A hand wheel $a$ rotates through the intermediary of bevel wheels $b$, $c$ the vertical shaft $d$ and by this vertical shaft through the intermediary of bevel wheels $e$, $f$ a horizontal shaft $g$ which rotates a pinion $h_1$. This pinion $h_1$ gears with a pinion $h_2$ to oppositely rotate the latter and a spur wheel $i_1$ (Figs. 3 and 4). From the pinion $h_2$ a pinion $h_3$ and through the same a spur wheel $i_2$ is rotated. The spur wheels $i_1$ and $i_2$, rotating the one in the right hand direction and the other in the left hand direction, mesh with racks $k_1$, $k_2$ respectively so that these racks are moved in opposite directions. These racks are mounted in guides not shown and slide on rollers 1 of the truck frame.

The racks $k_3$, $k_4$ at the other end of the frame are operated by spur wheels $i_3$ and $i_4$ mounted on continuous shafts $p$, $q$ respectively. The spur wheels $i_1$ and $i_3$ serve to move to the right the racks $k_1$ and $k_3$ with the levers $m_1$, $n_1$ and $m_3$, $n_3$ carrying the bed plates $o_1$ and $o_3$, and the spur wheels $i_2$ and $i_4$ serve to move to the left the racks $k_2$ and $k_4$ with levers $m_2$, $n_2$ and $m_4$, $n_4$ with bed plates $o_2$, $o_4$ (Figs. 2 and 5).

Guide rods $l_1$ to $l_4$, movable in sleeves $x$ or the like, are connected to racks $k_1$ to $k_4$ in a manner to be later described. The bed plates $o_1$ to $o_4$ are of T-shaped cross section (Fig. 1). To the vertical webs of the T-shaped bed plates the elbow levers $m_1$ to $m_4$ and $n_1$ to $n_4$ are pivotally connected. The other ends of the elbow levers $m_1$ to $m_4$ are pivotally connected to the racks $k_1$ to $k_4$, and the other ends of the elbow levers $n_1$ to $n_4$ are pivotally connected to the guide rods $l_1$ to $l_4$.

Suppose frames B (Fig. 1) are mounted on the bed plates $o_1$ to $o_4$ and designed to be deposited at the sides of the truck, the operation is as follows:

By rotating the hand wheel $a$ the gear wheels $h_1$ to $h_4$ and pinions $i_1$ to $i_4$ are rotated through the intermediary of the bevel wheels $c$, $b$, and $e$, $f$, whereby the racks $k_1$ to $k_4$ are moved outward in lateral directions. As soon as the racks project a predetermined length from the truck, the guide rods $l_1$ to $l_4$, which have also been moved outward, are stopped by any convenient means, for instance each by a stud $z_1$ Fig. 2 engaging with an indentation of the corresponding guide rods $l_1$ to $l_4$ respectively. A special form of construction of the mechanism for inserting the stud into the guide rods $l_1$ to $l_4$ will be hereinafter described. Owing to the stoping of the rods $l_1$ to $l_4$ by the studs $z_1$ and owing to the continuing rotation of the pinions $i_1$ to $i_4$ and to the continuing movement of the racks $k_1$ to $k_4$ the elbow levers $m_1$ to $m_4$ pivot around the movable fulcrums $r_1$ and also the elbow levers $n_1$ to $n_4$ until the bed plates $o_1$ to $o_4$ with the frames B have arrived in the lowest position.

The pivotable connection between the bed plates, the racks and guide rods and the elbow levers is effected by pivot pins $s_1$, $t_1$, $u_1$, $r_1$ to $s_4$, $t_4$, $u_4$ and $v_4$.

The bed plates remain always in the horizontal position during the raising and lowering operations for the reason that each bed plate together with its levers $m$ and $n$ and sliding rods $l$ forms a parallel motion device which is operated by the racks $k$. The racks $k$ are pivoted at $s$ to their respective rods $l$ which are thus moved inwardly and outwardly by the racks in order to engage the bed plates with the brick frames or withdrawing them therefrom. When the hand wheel $a$ is rotated the frames B resting on the bed plates $o_1$, $o_3$ and $o_2$, $o_4$ of the truck will first move away from each other to be then swung in opposite lateral directions and finally lowered and deposited on the ground.

The pulling out of the bed plates $o_1$ to $o_4$ from under the frames is effected in the following manner:

By operating a hand lever $z$ and by the same a rope and lever $z_3$, controlled by compression spring $z_4$, the studs $z_1$ are first pulled out of the holes $z_2$ in the guide rods $l_1$ to $l_4$ so that, when the hand wheel $a$ is then rotated in the opposite direction, the guide rods $l_1$ to $l_4$, which are no longer locked, with the elbow levers $m_1$ to $m_4$ and $n_1$ to $n_4$ and racks $k_1$ to $k_4$ will first slide in inward direction until the guide rods $l_1$ to $l_4$ strike against an abutment $y$ in the sleeve $x$. When the guide rods have arrived at the abutment in sleeve $x$ the bed plates $o_1$ to $o_4$ have been pulled from under the drying frames B.

When the rotating of the hand wheel $a$ is continued, the elbow levers $m_1$ to $m_4$ and $n_1$ to $n_4$ with the bed plates $o_1$ to $o_4$ are rotated in an inward direction.

In Fig. 2 the mechanism for operating the studs $z_1$ and the guide rod $l_2$, is illustrated. In the position shown the stud $z_1$ is in the released position and it engages automatically with the indentation or notch $z_2$ as soon as the rod $l_2$ has been shifted sufficiently to the left. Spring $z_4$ acting through pivoted lever $z_3$ causes the automatic engagement of stud $z$ in notch $z_2$.

When frames B have to be placed on a truck, the bed plates $o_1$ to $o_4$ being in the lowered inward and withdrawn position, the hand wheel $a$ is again turned clockwise, whereby the bed plates $o_1$ to $o_4$ are brought to a position under the drying frames B. At the end of this forward movement the studs $z_1$ engage again with the indentations or notches $z_2$. When the hand wheel $a$ is further rotated the studs $z_1$ being locked, the mechanism does not move back horizontally but it is swung first upward by the elbow levers $m_1$ to $n_1$ and $n_1$ to $n_4$ and deposits the frames B on the truck. After the loading the studs $z_1$ are disengaged again, so that, when rotation of the hand wheel is continued the two frames are shifted inwards into the initial position.

I claim:

1. A truck for conveying brick-frames, comprising two swingable and lowerable bed plates on each side of the truck, two elbow levers pivotally connected to each bed plate, a rack pivotally connected to one elbow lever, a guide rod pivotally connected to both elbow levers, said guide rods each having an indentation for limiting their movement, studs mounted adjacent said guide rods, and means for engaging at the desired moment said studs each with the indentation of the corresponding guide rod.

2. A truck for conveying brick-frames, comprising two swingable and lowerable bed plates, two elbow levers pivotally connected to each bed plate, a rack, a roller in the truck fame for guiding said rack, gear wheels for shifting said racks, a hand wheel for operating said gear wheels, a guide rod pivotally connected to each elbow lever, said guide rods each having an indentation for limiting the stroke of the guide rods, a sleeve for each guide rod, a stud adapted to engage with each indentation, a spring-controlled lever on one end of which said stud is mounted, a hand lever on the upper portion of said truck, and a rope connecting said hand lever with the other end of said spring-controlled lever.

3. A truck for conveying brick-frames, comprising a pair of bed plates at each side of the truck, one plate of each pair being at each end of the truck, the plates at opposite sides of the truck abutting when in raised position, two elbow levers pivoted to each plate, a guide rod, a rack for each plate slidable transversely of the truck, one of said levers being pivoted to the rack, and both being pivoted to said guide rod, and stop means for the guide rod.

4. In a truck, a truck frame, bed plates, a parallel motion device on the frame for supporting said plates, means for moving such device laterally of the truck frame, and a stop for arresting such movement, whereby the continued operation of such moving means swings said parallel motion device.

5. In a truck, a truck frame, bed plates, a parallel motion device including a guide rod connecting said device with said frame, said guide rod being slidable transversely of the truck, stop means for such rod, a rack connected to said device, means to operate the rack, said rack first operating to move said device and plate laterally of the truck until engaged by the stop device and then swing the plate to lower it.

6. A truck for conveying brick-drying-frames, comprising two bed plates for carrying drying frames arranged on each long side of the truck, at least two pairs of levers pivotally connected with each bed plate, guides extending laterally of the truck toward its long sides, guide rods slidably disposed in said guides, latches for releasably holding said rods in extended positions at the sides, each pair of levers being pivotally connected to one of said rods at spaced points, at least one of the levers of each bed plate having an angular arm, means connected with the free ends of said arms for rocking the levers about their connections with the guide rods for raising and lowering the bed plates in a horizontal plane, said truck with said frames on it being of a height and width that it can pass with said frames through an open kiln-door.

In testimony that I claim the foregoing as my invention, I have signed my name hereto.

GÜNTHER HARTMANN.